(12) United States Patent
Memili

(10) Patent No.: US 10,807,146 B2
(45) Date of Patent: Oct. 20, 2020

(54) METHOD AND APPARATUS FOR PRODUCING A HYBRID CONNECTION

(71) Applicant: FORD GLOBAL TECHNOLOGIES, LLC, Dearborn, MI (US)

(72) Inventor: Selahattin Tuerel Memili, Duisburg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 419 days.

(21) Appl. No.: 15/481,551

(22) Filed: Apr. 7, 2017

(65) Prior Publication Data

US 2017/0291215 A1   Oct. 12, 2017

(30) Foreign Application Priority Data

Apr. 8, 2016   (DE) .......................... 10 2016 205 924

(51) Int. Cl.
*B23K 20/00*   (2006.01)
*B21J 15/02*   (2006.01)
(Continued)

(52) U.S. Cl.
CPC ............ *B21J 15/027* (2013.01); *B23K 20/12* (2013.01); *B23K 20/127* (2013.01); *B23K 20/22* (2013.01);
(Continued)

(58) Field of Classification Search
CPC .... B23K 20/122; B23K 20/12; B23K 20/127; B23K 20/1245; B23K 20/1295
See application file for complete search history.

(56) References Cited

U.S. PATENT DOCUMENTS 8,752,603 B2   6/2014  Christ et al.
9,919,379 B1 *  3/2018  Jang ...................... B21J 15/027
(Continued)

FOREIGN PATENT DOCUMENTS

CN    1878454 A    12/2006
CN  101817142 A     9/2010
(Continued)

OTHER PUBLICATIONS

German Patent and Trademark Office, German Search Report for the corresponding German Patent Application No. 10 2016 205 924.6 dated Apr. 27, 2016.
(Continued)

*Primary Examiner* — Erin B Saad
(74) *Attorney, Agent, or Firm* — Vincent Mastrogiacomo; Brooks Kushman P.C.

(57) ABSTRACT

A method for producing a connection between a sandwich element and a metal element is disclosed herein. In this method, the sandwich element has an interlayer arranged between two cover elements. The method includes providing the sandwich element and the metal element; placing the sandwich element and the metal element in face-to-face contact at least partially overlapping; adding a fastener from the sandwich-element side while a base of the fastener extends within the sandwich element; and friction welding, from the metal-element side, to form a hybrid connection having a mechanical connection between the fastener and the sandwich element and a welding connection between the fastener and the metal element.

10 Claims, 6 Drawing Sheets

(51) Int. Cl.
  *B23K 20/12* (2006.01)
  *F16B 5/04* (2006.01)
  *B23K 20/22* (2006.01)
  *B23K 101/00* (2006.01)
  *B23K 103/16* (2006.01)

(52) U.S. Cl.
  CPC .......... *F16B 5/04* (2013.01); *B23K 2101/006* (2018.08); *B23K 2103/172* (2018.08)

(56) References Cited

U.S. PATENT DOCUMENTS

| | | | |
|---|---|---|---|
| 2002/0125297 A1* | 9/2002 | Stol | B21J 15/027 228/112.1 |
| 2003/0201306 A1* | 10/2003 | McTernan | B23K 20/12 228/112.1 |
| 2006/0096740 A1* | 5/2006 | Zheng | F28D 15/0233 165/104.26 |
| 2007/0199924 A1* | 8/2007 | Yoshida | B23K 11/11 219/109 |
| 2010/0089977 A1 | 4/2010 | Chen et al. | |
| 2013/0094896 A1 | 4/2013 | Christ et al. | |
| 2017/0001235 A1 | 1/2017 | Hartwig-Biglau et al. | |
| 2018/0178316 A1* | 6/2018 | Park | F16B 5/08 |
| 2018/0209468 A1* | 7/2018 | Freis | F16B 33/008 |

FOREIGN PATENT DOCUMENTS

| | | |
|---|---|---|
| CN | 102615508 A | 8/2012 |
| CN | 103237648 A | 8/2013 |
| CN | 103240564 A | 8/2013 |
| DE | 102004034498 A1 | 2/2006 |
| DE | 112006003552 T5 | 1/2009 |
| DE | 102011114306 A1 | 3/2013 |
| DE | 102012203888 A1 | 9/2013 |
| DE | 202014002917 U1 | 5/2014 |
| DE | 102014011599 A1 | 2/2016 |
| EP | 2329905 A1 | 6/2011 |
| EP | 2689882 A2 | 1/2014 |
| WO | 2015106244 A2 | 7/2015 |

OTHER PUBLICATIONS

Thyssenkrupp: "Einsatzpotential Von Litecor in Der Karosserie", ATZ extra, Oct. 31, 2014, XP055399938, found in URL: https://incarplus.thyssenkrupp.com/navigator_atz_pdf/ATZ_InCar_plus_Karosserie_Potenzialanalyse_LITECOR.pdf.

* cited by examiner

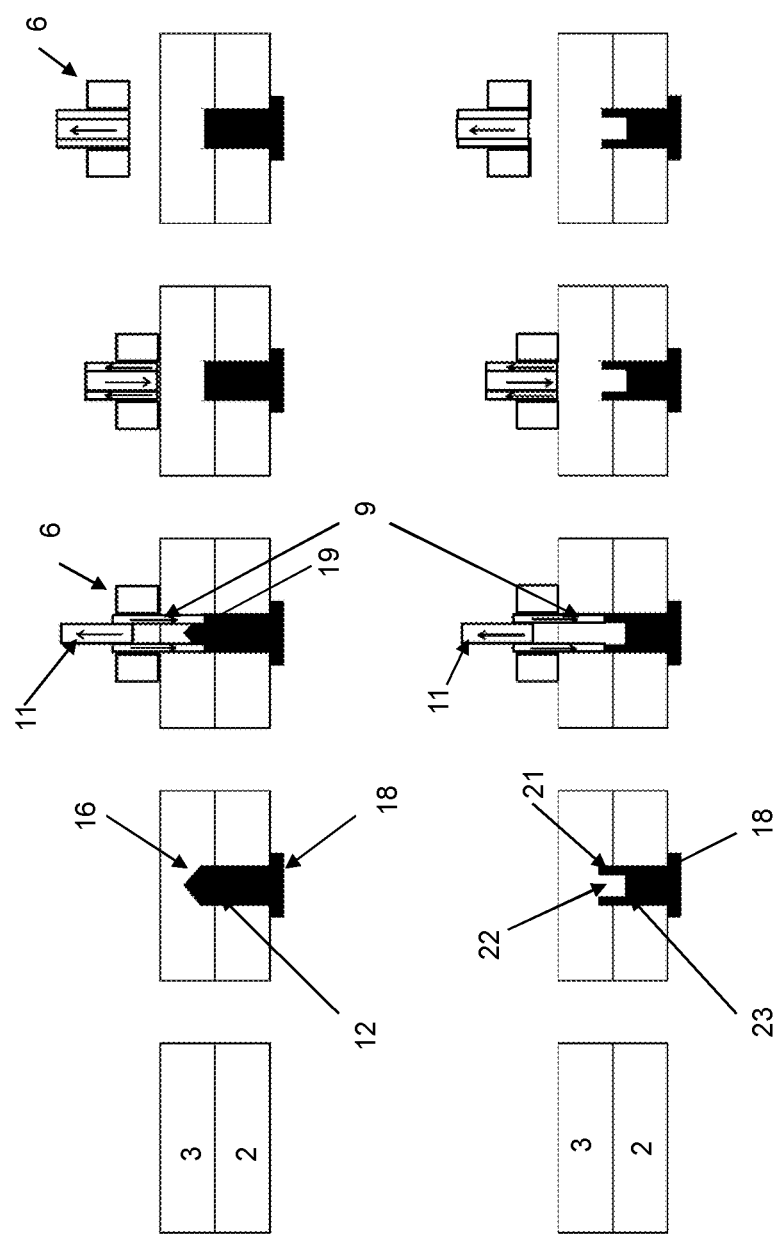

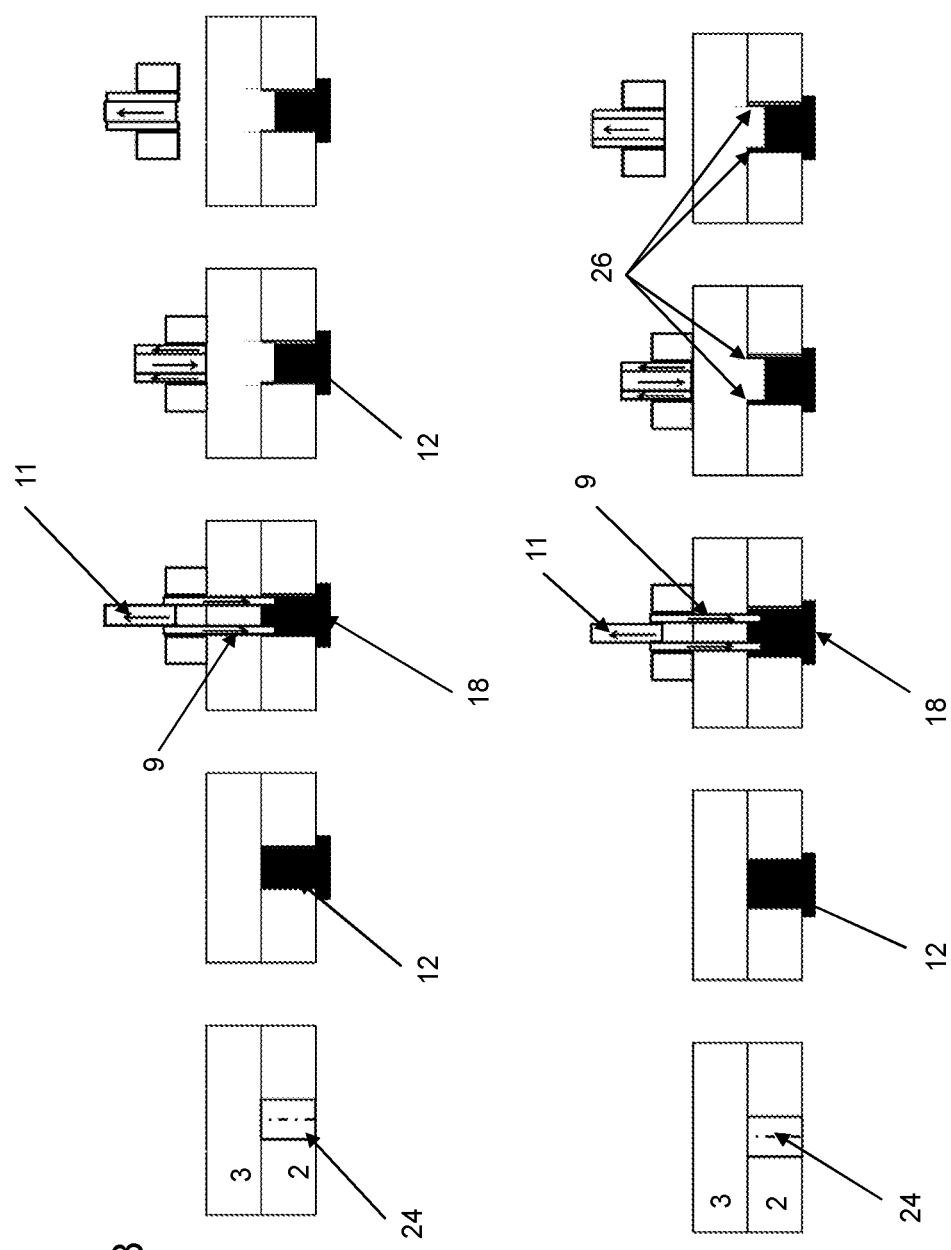

METHOD AND APPARATUS FOR PRODUCING A HYBRID CONNECTION

CROSS-REFERENCE TO RELATED APPLICATIONS

This application claims foreign priority benefits under 35 U.S.C. § 119(a)-(d) to DE Application 10 2016 205 924.6 filed Apr. 8, 2016, which is hereby incorporated by reference in its entirety.

TECHNICAL FIELD

The disclosure relates to a method and an apparatus for connecting a sandwich element and a metal element.

BACKGROUND

Sandwich elements of this type are known for example under the brand name LITECOR® and have a plastic core which is sheathed by two metal cover sheets. The sandwich element is therefore lower in weight than full steel sheets but also very resistant to bending and buckling. Such composite materials can be used in the vehicle industry, for example in vehicle bodies, as planar components such as a roof, door, tailgate or hood, and point the way to efficient components which are lower in weight and less expensive than metal elements of steel or light metals such as aluminum or magnesium.

Within the context of the disclosure, metal elements are steel sheets or light metal sheets such as aluminum sheets or magnesium sheets.

An assembly of a motor vehicle body having a sheet component, which is reinforced by a reinforcing component which is made of a fiber composite material and is mounted in a planar manner on said sheet component, is disclosed in DE 10 2012 203 888 A1. As discussed in DE 10 2012 203 888 A1, such hybrid components cannot be connected to other components in the region of the reinforcing component by conventional joining methods used in vehicle body construction, such as spot welding. Therefore, DE 10 2012 203 888 A1 proposes that the reinforcing component have at least one cutout so that the sheet component can be connected to another sheet component in the region of the cutout using a conventional joining method. The sheet component is a reinforcing sheet of a side skirt. The reinforcing component consists of a carbon fiber reinforced plastic, whereas the sheet component consists of a weldable iron material.

EP 2 689 882 A2 discloses a device and a method for friction stir welding. In this, two different metal sheets, i.e. an aluminum sheet and a steel sheet, are connected to one another. A filler material is used to close a connection crater.

US 2010/0089977 A1 also discusses the friction stir welding of different materials. In this, an aluminum sheet is connected to a magnesium sheet, wherein combinations of copper, tin and zinc and other powders could strengthen the magnesian and aluminous friction stir welding material.

In motor vehicle construction, in particular in relation to the vehicle body, it is advantageous if this is particularly light. This saves on plastic and therefore also reduces the emission of harmful gases, such as $CO_2$. The structural components, i.e. vehicle body components, should be designed for very different loads in different regions. With this, the components must also be produced so that the greatest potential for a lightweight construction can be achieved with as little material wastage as possible. Reinforcing measures can therefore also be provided in regions which are exposed to particularly high loads. For example, the components can be formed from a base element and have thickened portions in some sections as reinforcing measures. So-called "tailored roll blanks" are known. However, tailored roll blanks are very complex to produce and, in this respect, also very expensive. It is also disadvantageous that, in the event of a single, even slight, rolling error, it is necessary to dispose of the entire component since this then no longer meets the requirements. However, it is also conceivable to provide separate reinforcing elements on the base element, which reinforcing elements can be made of fiber reinforced plastic. As already disclosed in DE 10 2012 203 888 A1, conventional joining methods are unsuitable. Reinforcing elements can be connected to the base element by means of adhesive connections and can reinforce this base element so that the expected loads can be absorbed by the vehicle body component. However, it is not possible to achieve the best possible connecting performance using adhesive connections. Additional mechanical connections are still necessary in this respect, although they can destroy the fibers of the fiber reinforced plastic with the result that the desired reinforcement is negated. For example, reinforcing elements can be fastened to the base element with rivets which inevitably destroy the fibers in the connecting region. It is moreover possible to reduce shearing and fracturing forces of the original connection whereby corrosion problems can also occur.

A possible connection of an aluminum sheet to a fiber reinforced plastic is discussed in the article "Friction spot joining of aluminum AA6181-T4 and carbon fiber-reinforced poly (phenylene sulfide): Effects of process parameters on the microstructure and mechanical strength" (material and design 66 (2015), 437-445), wherein reference is made to EP 2 329 905 B1.

EP 2 329 905 B1 discloses a refill friction stir welding method in which a light metal sheet is connected to a fiber reinforced plastic. The friction stir welding device has a pin, a sleeve and a clamping ring. This device is said to enable the closing of the friction welding crater by means of the friction stir welding device in the course of the welding procedure, wherein, although the fiber reinforced plastic is melted, the fibers are said to remain undamaged. After the rotation has stopped, the materials harden so that the formerly melted regions adhere to one another. However, it is explicitly indicated here that the known disadvantages of adhesive connections are avoided since a separate adhesive is omitted.

The sandwich elements (LITECOR®) mentioned at the outset are suitable for use as planar components such as doors, roof, tailgate or hood. These components are conventionally screwed to other components such as hinges or bearing elements.

SUMMARY

The disclosure provides a method for connecting a sandwich element to a metal element so that a component, in particular a motor vehicle component, can be produced which, despite lower production costs, fulfills the necessary rigidity and/or crash requirements whilst giving the greatest possible consideration to weight. However, the disclosure is also based on the object of providing a device which is suitable for carrying out the method.

It should be pointed out that the features and measures described individually in the description below can be combined with one another in any technically useful manner and disclose further configurations of embodiments of the disclosure.

A method for producing a connection between a sandwich element and a metal element is disclosed, wherein the sandwich element has a dissimilar interlayer arranged between two cover elements. The method according to the disclosure comprises at least the following steps: providing the sandwich element and the metal element; placing the sandwich element and the metal element on top of one another so that they overlap at least in some regions; adding a fastener from the sandwich-element side, wherein the fastener is received with its base body entirely in the sandwich element; and carrying out a friction welding process from the opposite metal-element side so that a hybrid connection is formed, which has a mechanical connection between the fastener and the sandwich element and a material-locking connection between the fastener and the metal element.

Friction stir welding or refill friction stir welding is carried out from the metal-element side as the friction welding process. Within the context of the disclosure, the metal element is a steel sheet or light metal sheet, such as an aluminum sheet or a magnesium sheet. Within the context of the disclosure, the sandwich element has a dissimilar interlayer arranged between two preferably similar cover elements. The cover elements can be steel sheets or light metal sheets, such as aluminum sheets or magnesium sheets, wherein the mutually opposing cover elements can each consist of different materials. The dissimilar interlayer can be a plastic, e.g. a polymer. Within the context of the disclosure, a sandwich element can also be a carbon fiber reinforced plastic (CFRP). Motor vehicle components such as A, B, C or D pillars, but also other structural elements of the vehicle body, such as sills, i.e. components of the entire vehicle body, can be produced by means of the disclosure. These components produced according to the disclosure are more economical in relation to steel or light metals and moreover offer advantages in terms of weight. The metal element can therefore be regarded as a base element which is reinforced by the sandwich element, which means that the sandwich element can be regarded as a reinforcing element.

One example of a feature of the disclosure is that a friction welding process takes place from the metal-element side opposite the sandwich element. Therefore, despite the high frictional heat on the metal-element side, any thermal influence on the sandwich material is negligible. This is because only the metal element and the fastener are plasticized in some regions. However, a material-locking connection between the fastener and the metal element is produced, wherein the fastener is securely received in the sandwich element. The unplasticized part of the fastener remains in its original solid state.

So that the fastener can be securely received in the sandwich element, it can be constructed as a rivet. Therefore, a mechanical connection, i.e. a rivet connection, can ideally firstly be produced between the sandwich element and the metal element. The device designed for this will be discussed in more detail later. The rivet is driven into the metal element with its head region from the sandwich-element side, such that it breaks through the sandwich element. With this, the rivet reaches into the metal element with its head region, although it does not break through it. Therefore, a mechanical connection, i.e. a rivet connection, is firstly constructively generated between the sandwich element and the metal element. The fastener can furthermore have a type of external thread on its base body so that the mechanical connection is further secured.

It is constructive for the sandwich element to be positioned with respect to the metal element so that the sandwich element, i.e. the overlapping region, is arranged between the fastener and the metal element.

The fastener has a cylindrical base body and can be constructed to be sharply conical at its head region. However, the fastener can also be constructed to be U-shaped or flat at its head region.

Opposite the head region, the fastener has a widening of the otherwise cylindrical base body. The widening can also be described as an abutment flange, which abuts against the free surface of the sandwich element and thus constitutes a means for arresting the driving-in of the fastener, as it were, and prevents too deep a penetration into the metal element. The abutment flange can be interrupted as seen in the circumferential direction and therefore does not have to be of a continuous construction as seen in the circumferential direction.

In another example, a pre-punched hole, into which the fastener can be introduced, can be introduced in the sandwich element. Starting from the free surface here, the pre-punched hole extends completely through the entire sandwich element. The fastener has a cylindrical base body with a preferably flat head region and, opposite this, a foot region on which an abutment flange can be optionally provided. The cylindrical base body has a longitudinal extent up to the head region, which corresponds to the longitudinal extent of the pre-punched hole, i.e. the material thickness of the sandwich element. Only the abutment flange optionally arranged on the foot region projects beyond the pre-punched hole, i.e. the free surface of the sandwich element. The inside diameter of the pre-punched hole can be smaller than the external diameter of the cylindrical base body so that the fastener can be introduced into the pre-punched hole with press fit, as it were. Since the fastener is adapted to the material thickness of the sandwich element, its head region comes to abut directly against the corresponding surface of the metal element. It can be seen that it is therefore possible to dispense with an abutment flange. However, this can still be provided to reliably prevent the fastener from being driven too deeply into the metal element from the sandwich-element side. This procedure therefore dispenses with firstly establishing a mechanical connection to the metal element, although the fastener is still securely received in the sandwich element as already described above. A screw connection can also be provided on the cylindrical base body by means of a corresponding thread, i.e. an internal thread in the pre-punched hole and an external thread on the cylindrical base body.

As seen in cross-section, the fastener can have a width which is constructed to correspond to the preferred refill friction stir welding device, i.e. the external diameter of its sleeve. It is also possible for the fastener to be of a wider construction so that its external diameter projects beyond the sleeve.

If the fastener is to be inserted from the sandwich-element side, the material-locking connection is produced by friction welding, i.e. by the preferred refill friction stir welding (RFSSW or RFSEW) starting from the metal-element side.

It is constructive for the fastener to be formed from a similar material to the metal element. In this respect, the fastener can consist for example of steel or light metal, such as aluminum or magnesium. A similar weld connection can therefore be produced.

Corresponding starting points of the friction stir welding device are provided to correspond to the number of additional material bodies provided. The friction stir welding device is discussed in more detail below. The form-locking connecting regions here are preferably spaced from one another in a manner similar to spot welding connections. On an active side of the metal element, i.e. at the side on which the friction stir welding device acts by means of the friction stir welding head, the metal element is of a substantially flat construction, without craters and/or bumps, after the joining procedure (RFSSW or RFSEW).

The friction stir welding procedure is ideally carried out directly opposite the fastener from the metal-element side. The friction stir welding device has a non-rotatable outer clamping ring, a rotatable sleeve and a rotatable pin. A stir zone, i.e. a mixing zone between the fastener, ideally only its head region, and the metal element, is generated by means of the rotatable elements, in particular by the rotatable sleeve. The metal element, but also the fastener, is therefore plasticized by the frictional heat produced. Of the fastener, only the head region 16 is constructively plasticized, i.e. not the entire fastener. This is favorable since the thermal influence of the friction welding procedure, i.e. the frictional heat produced, is therefore negligible with regard to the sandwich element. This effect is still further promoted if, as seen in cross-section, the fastener is wider than the rotatable sleeve of the friction stir welding device.

It is expedient if, during the friction stir welding procedure, the stir zone is guided through the metal element and into the head region of the fastener.

If the fastener is received in the metal element with its head region, as a rivet, it is constructive if only the head region received in the metal element is plasticized. If the head region is sharply conical, the head region is leveled, as it were. If the head region is constructed in a U shape, only the limbs of the U are plasticized. However, the material-locking joining plane of the fastener and the metal element is arranged in the region of the metal element.

If the fastener is received in the previously established pre-punched hole without its head element penetrating into the metal element, the stir zone is guided through the metal element into the head region of the fastener. However, the entire fastener is again not plasticized in this case, only the head region thereof. In this case, the material-locking joining plane of the fastener and the metal element is arranged in the region of the sandwich element.

As seen in cross-section, the stir zone here is favorably preferably smaller than the width of the fastener. This was already mentioned above in relation to the external diameter of the sleeve, which is smaller than the width of the fastener. There therefore remains an outer annular region of the fastener which is not plasticized. It is constructive for this annular region to correspond to the expected heat influence zone around the stir zone in terms of its dimensions. Therefore, as a result of the stir zone being advantageously restricted to a partial head region of the fastener not only in terms of its width but also in terms of its depth, the heat entering the sandwich element is negligible since the heat influence zone is restricted to the metal element and the fastener. However, the friction welding device plunges with its rotatable elements into the head region of the fastener so that the stir zone is guided into the head region. A material-locking joining plane of the metal element and the fastener is therefore generated, which is arranged in the region of the sandwich element.

A material-locking connection between the metal element and the fastener is generated by the procedure described. The two elements are welded to one another, as it were. As a result of the fastener either being introduced from the sandwich element as a rivet or being securely received or, for example, pressed (press fit) in a pre-punched hole of the sandwich element as a cylindrical body, a hybrid connection is produced which has a mechanical connection and a material-locking connection. A connection is therefore generated with maximum connecting qualities, not only in terms of shearing and fracturing stresses. Structural components can therefore also be considerably more flexible in design.

The device-related part of the object is achieved by a device having the features of claim 9. The device according to the disclosure is designed to carry out the method described above for connecting a sandwich element to a metal element and has a friction welding device, preferably a friction stir welding device, which is further preferably a refill friction stir welding device. The term friction welding device, which covers each of the preferred configurations, is used for simplicity below. Provision is constructively made for the friction welding device to be arranged at one end of a supporting arm, at the opposite end of which at least one holding and supply device for at least one fastener is arranged.

Therefore, the fastener can be supplied from one side, namely from the sandwich element side, wherein the friction welding device can act from the opposite side, i.e. from the metal-element side, so that the friction welding process can be carried out.

It is favorable if the supporting arm is constructed in a C shape so that the supply and holding device and the friction welding device are arranged opposite one another.

It is expedient if the supply and holding device has a delivery element with which a mechanical connection can be produced. The mechanical connection can be a rivet connection or a press fit, wherein an additional screw connection is also conceivable. For a rivet connection, the fastener is constructed as a rivet which is driven into the metal element with its head region by the delivery element of the supply and holding device, such that it breaks through the sandwich element. For a press fit, a pre-punched hole is firstly introduced into the sandwich element, into which the fastener is pressed. The delivery element can be used for this, wherein its power can be reduced, or the supply and holding device is constructed to have a corresponding power so that it is possible to dispense with the delivery element. As mentioned above, corresponding threads can also be provided; or only the fastener has a type of external thread, i.e. engagement teeth as it were, which further reinforce the selected mechanical connection.

It is favorable for both the friction welding device and the supply and holding device to be movable from an idle position into an operating position and vice versa relative to the supporting arm, i.e. relative to the respective end at which the relevant devices are arranged. In the idle position, the devices are spaced from one another so that at least mutually overlapping elements, i.e. the sandwich element and the metal element, can be brought into a clearance. The two devices can preferably be transferred from the idle position into the operating position at the same time. In this operating position, both devices are in contact with the respective surfaces of the relevant element. The friction welding device is therefore in contact with the free surface of the metal element. The supply and holding device is in contact with the free surface of the sandwich element. Both devices are arranged opposite one another. If the fastener is received in the sandwich element, i.e. supplied thereto, the friction welding process begins, wherein the supply and holding device assumes the holding function. The fastener can also be additionally held here, wherein it is also possible for the sandwich element to press against the metal element. During the friction welding process, the sleeve, together with the pin, firstly plunges into the metal element whilst rotating, whereby the material is plasticized accordingly. If the fastener is a rivet which is arranged with its head region within the metal element, then the head region is likewise plasticized by the heat produced. If the fastener lies with its head region against the corresponding surface of the metal element, the sleeve plunges in a rotating manner into the head region of the fastener and therefore plasticizes the metal element as well as the relevant head-region portion. The material-locking joining plane of the metal element and the fastener is therefore produced in each case within the sandwich element or within the metal element. From a certain plunging depth, the pin is moved in opposition to the plunging movement of the sleeve, i.e. withdrawn as it were. At the same time as the rotatable sleeve is withdrawn into its starting position, the rotatable pin is in turn guided in the opposite direction towards the free surface of the metal element so that, after the refill friction stir welding process, the free surface is crater-free and flat. The friction welding device, but also the supply and holding device, is transferred into its respective idle position. Further connections can now be established, or the mutually connected elements (sandwich element/metal element), i.e. the component formed, in particular a structural component of a motor vehicle, is removed from the device when the necessary connections have been established.

A method for producing a connection between a sandwich element and a metal element is disclosed herein. In this method, the sandwich element has an interlayer arranged between two cover elements. The method includes providing the sandwich element and the metal element; placing the sandwich element and the metal element in face-to-face contact at least partially overlapping; adding a fastener from the sandwich-element side while a base of the fastener extends within the sandwich element; and friction welding, from the metal-element side, to form a hybrid connection having a mechanical connection between the fastener and the sandwich element and a welding connection between the fastener and the metal element. The friction welding may be a friction stir weld process. A portion of the metal element and a head region of the fastener may be plasticized during the friction stir welding. The fastener may be a rivet driven into the sandwich element such that a head of the rivet reaches the metal element. A holed may be pre-punched into the sandwich element to receive the fastener. The fastener may be of a similar material to a material of the metal element. A welding joining plane of the fastener and the metal element may be arranged within the metal element or the sandwich element.

A connection assembly includes a sandwich element, a metal element, a supporting arm, a supply and holding device, and a friction welding device. The sandwich element has an interlayer between two cover layers. The supporting arm has first and second ends. The supply and holding device is mounted to the first end to introduce a fastener into the interlayer. The friction welding device is mounted to the second end to weld the metal element to the fastener to form a hybrid connection between the sandwich element and the metal element having a mechanical connection between the fastener and the sandwich element and a welding connection between the fastener and the metal element.

A method for connecting a sandwich element and a metal element includes driving a fastener into the sandwich element placed upon the metal element such that a base of the fastener is disposed within the sandwich element; and friction welding the metal element to the fastener to form a hybrid connection including a mechanical connection between the fastener and the sandwich element and a welding connection between the fastener and the metal element.

Further advantageous details and effects of the disclosure are explained in more detail below with reference to example embodiments illustrated in the figures, which show:

BRIEF DESCRIPTION OF THE DRAWINGS

FIG. 6 shows a method according to an embodiment in successive steps in a first variant configuration;

FIG. 7 shows the method according to an embodiment in successive steps in a second variant configuration;

FIG. 8 shows the method according to an embodiment in successive steps in a third variant configuration;

FIG. 9 shows the method according to an embodiment in successive steps in a fourth variant configuration.

DETAILED DESCRIPTION

Figure 1:
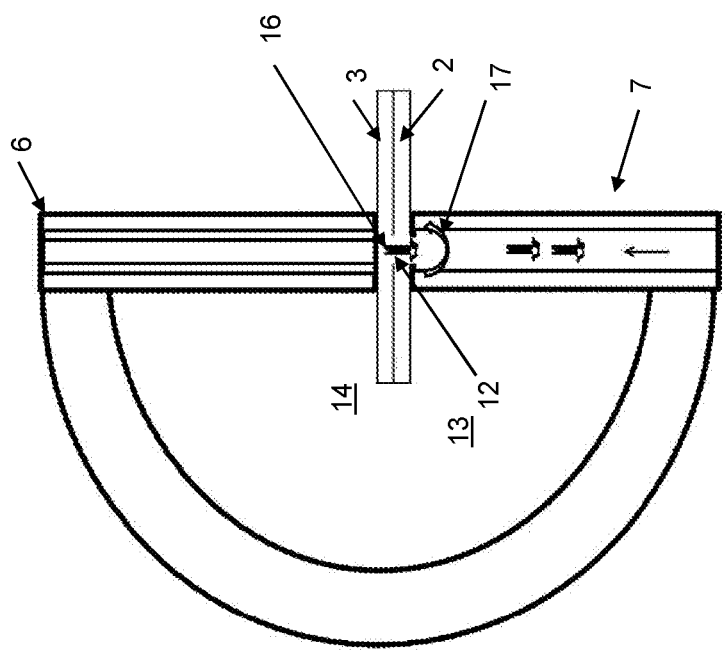
FIG. 1 shows a cross-section of an apparatus for connecting a sandwich element to a metal element in an idle position.

As required, detailed embodiments of the present disclosure are disclosed herein; however, it is to be understood that the disclosed embodiments are merely examples that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the different figures, the same parts are always provided with the same reference numerals and, for this reason, are generally also described only once.

FIG. 1 shows an apparatus 1 which is designed for connecting a sandwich element 2 to a metal element 3. The sandwich element 2 has an interlayer arranged between two cover elements. The cover elements can be formed from a steel sheet or from a light metal sheet, such as an aluminum sheet or magnesium sheet. The interlayer can be a plastic, for example a polymer. The metal element 3 can be a steel sheet or a light metal sheet, such as an aluminum sheet or a magnesium sheet.

The apparatus 1 has a supporting arm 4, which is constructed for example in a C shape. The supporting arm 4 has a friction welding device at a first end of two ends. The friction welding device may be a friction stir welding device or a refill friction stir welding device 6. A supply and holding device 7 is arranged upon the supporting arm 4 at a second end opposite the refill friction stir welding device 6. The refill friction stir welding device 6 has an outer clamping ring 8, a rotatable sleeve 9 and a rotatable pin 11. The supply and holding device 7 includes at least one material body, such as a fastener 12 or a plurality of fasteners 12. The fasteners 12 can be supplied in the manner of a magazine. The supply and holding device 7 can have a delivery element. A rivet connection can be produced by means of the delivery element. In one example the fastener 12 is a rivet.

As can be seen in FIG. 1, the supply and holding device 7 is arranged on the sandwich-element side 13, whereas the refill friction stir welding device 6 is arranged on the metal-element side 14.

The sandwich element 2 and the metal element 3 are placed on top of one another so that at least one overlap is formed, in which the desired connection can be produced. In FIG. 1, both the refill friction stir welding device 6 and the supply and holding device 7 are arranged in their respective idle position on the supporting arm 4.

Figure 2:
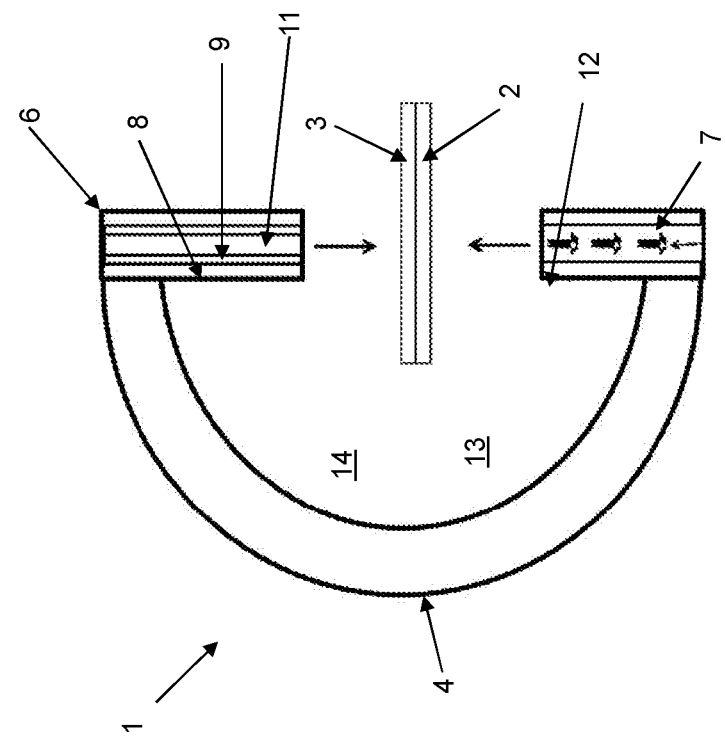
FIG. 2 to FIG. 5 shows the apparatus from FIG. 1 in successive steps.
Figure 4:
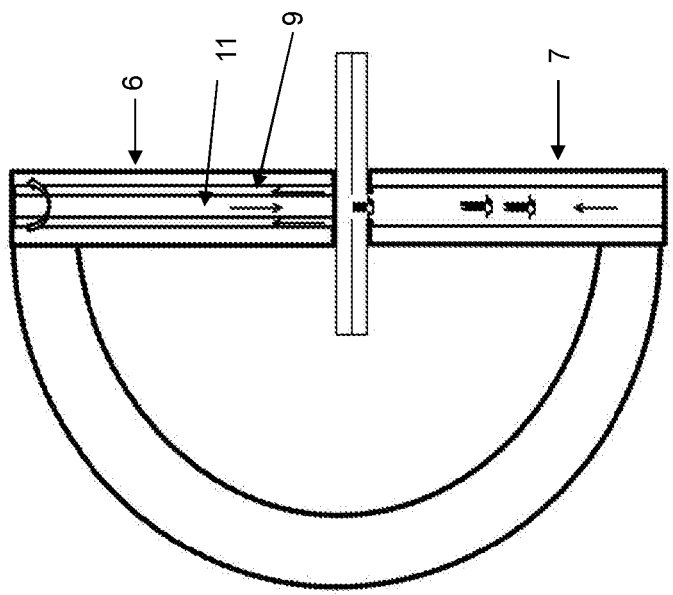
Figure 3:
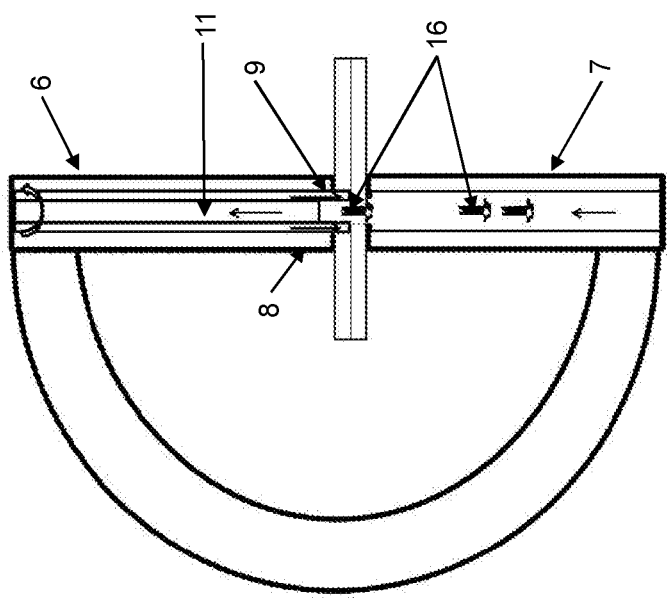
Figure 5:
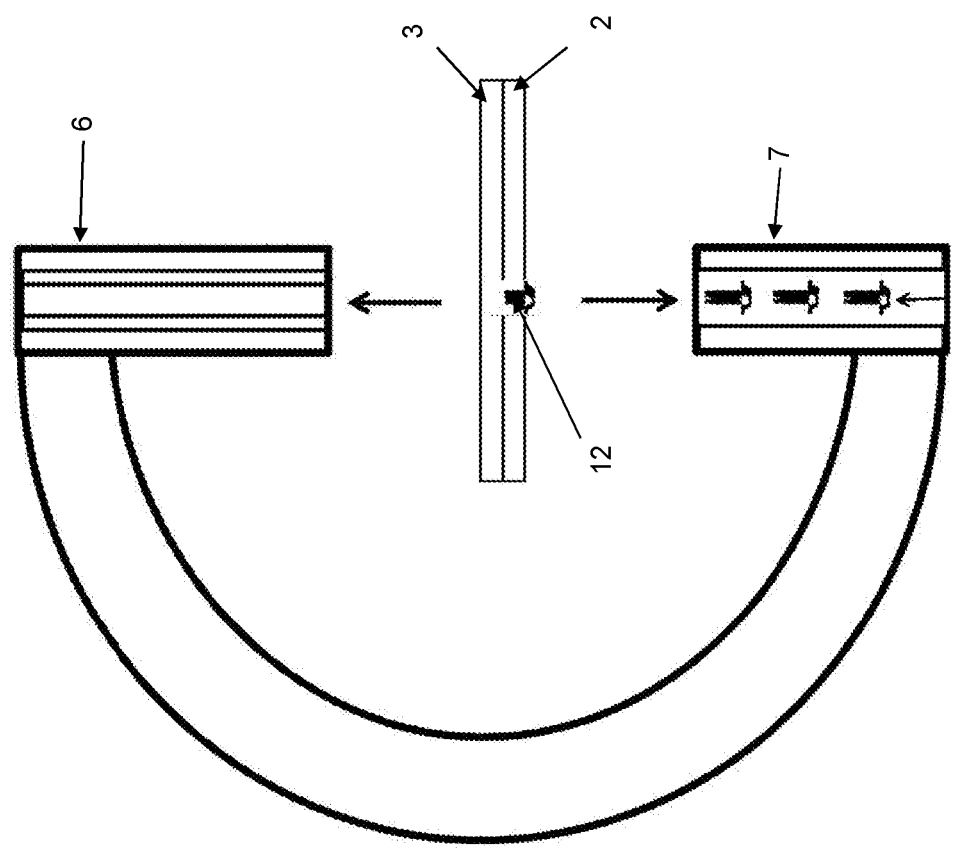

Both devices 6 and 7 can be transferred, relative to the supporting arm 4, from the idle position into an operating position, which can be seen in FIGS. 2 to 4. In FIG. 5, both devices 6 and 7 are again in the idle position.

In the connecting step illustrated in FIG. 2, both the refill friction stir welding device 6 and the supply and holding device 7 are placed on a surface of the respective element 2 or 3. As a rivet, the fastener 12 is delivered with its cylindrical base body through the sandwich element 2 in the direction of the metal element 3. The fastener 12 reaches into, without breaking through, the metal element 3 with its head region 16. The supply and holding device 7 can also rotate as can be seen in FIG. 2 from the rotation arrow 17.

The fastener 12 may have an external thread on its cylindrical base body so that the mechanical connection produced by the riveting procedure is further reinforced. The rotation of the supply and holding device 7 can therefore effect a screwing movement of the fastener 12 with its external thread. The fastener 12 may also be threadless. The fastener 12 optionally has an abutment flange 18 (FIG. 6) at its end opposite the head region 16.

When producing the mechanical connection between the sandwich element 2 and the metal element 3 by means of the fastener 12, the refill friction stir welding device 6 serves as a counter bearing and presses the metal element 3 in the direction of the sandwich element 2.

The welding process, i.e. the refill friction stir welding process, is illustrated in FIG. 3. In this welding process, the sleeve 9 plunges in a rotating manner into the metal element 3, whilst the pin 11 is moved back in opposition thereto. In prior art examples, the sleeve 9 and the pin 11 were both plunged into the metal element 3 and the pin 11 is only moved in the opposite direction after reaching a predeterminable plunging depth. With this welding process, the metal element 3, in some regions, but also the head region 16 of the fastener 12, is plasticized. This can be seen in FIG. 3 from the relatively short fastener 12 compared to a length of the fastener 12 shown in FIGS. 1 and 2. Both of the elements 2 and 3 are connected to one another with material locking as a result of the plasticization. A joining plane 29 can be seen in FIG. 10 further discussed below. The supply and holding device 7 has a counter bearing function and presses the sandwich element 2 in the direction of the metal element 3.

FIG. 4 shows a further step of the refill friction stir welding process in which the pin 11 is moved in a direction toward the metal element 3, whereas the sleeve 9 is moved in an opposite direction thereto. As a result, the metal element 3 is substantially crater-free and flat at the surface on which the refill friction stir welding device acts or operates, as can be seen in FIG. 5.

A hybrid connection is therefore generated between the sandwich element 2 and the metal element 3. The hybrid connection has a mechanical connection between the fastener 12 and the sandwich element 2 and a material-locking or welding connection between the fastener 12 and the metal element 3.

Successive steps shown from the left in the plane of the drawing to the right in the plane of the drawing according to FIGS. 1 to 5 are illustrated schematically in FIGS. 6 to 9.

In FIG. 6, the fastener 12 is constructed as a rivet, wherein the head region 16 is constructed in the shape of a tapering cone. As can be seen in the center of FIG. 6, the sleeve 9 plunges into the metal element 3 and rotates concentrically about a cone-shaped tip 19 of the fastener 12 so that the cone-shaped tip 19 is leveled. The sleeve 9 does not plunge into a cylindrical base of the fastener 12. Instead, the plunging action ends at a spacing from the surface of the sandwich element 2. A welding joining plane of the fastener 12 and the metal element 3 is arranged within the metal element 3. A mechanical connection of the fastener 12 at the sandwich element 2 is formed by the rivet connection. The sandwich element 2 is therefore connected to the metal element 3.

In FIG. 7, the fastener 12 is constructed in a U-shape at its head region 16, as seen in cross-section, and has two limbs 21 of the U, as seen in cross-section, between which there is a clearance 22 which is delimited by a base 23. The clearance 22 may be filled by penetrating material of the metal element 3 during the driving-in procedure, so that an additional mechanical connection is generated. The limbs 21 of the U are constructed for contact with the sleeve 9 as it plunges in a rotating manner into the metal element 2. As can be seen, the sleeve 9 does not plunge into the cylindrical base body surrounded by the sandwich element 2. Instead, the plunging action ends at a spacing from the surface of the sandwich element 2 and at a spacing from the base 23. The welding joining plane of the fastener 12 and the metal element 3 is arranged within the metal element 3, wherein the limbs 21 of the U furthermore remain. A mechanical connection between the fastener 12 and the sandwich element 2 is formed by the rivet connection. The sandwich element 2 is therefore connected to the metal element 3. The limbs 21 of the U-shape are unplasticized and received in the metal element 3 to form a further mechanical connection to the metal element 3. In FIGS. 6 and 7, the fastener 12 has been introduced through the sandwich element 2 without pre-machining and such that the head part 16 reaches into the metal element 3 so that the rivet connection is generated.

In the embodiments illustrated in FIGS. 8 and 9, the sandwich element 2 is pre-machined and has a pre-punched hole 24. The pre-punched hole 24 reaches completely through the sandwich element 2. The fastener 12 is pressed and/or screwed into the pre-punched hole 24 by the supply and holding device 7. For screw-in purposes, the fastener 12 can have an external thread, as described above and the pre-punched hole 24 can also have an internal thread corresponding thereto.

An inside diameter of the pre-punched hole 24 may be smaller than an external diameter of the fastener 12. The fastener 12 can therefore be either pressed into the pre-punched hole 24 with a force locking using a press fit or screw process or may be rotated and pressed into the pre-punched hole 24 with force and form locking. The fastener 12 may therefore be securely held in the sandwich element 2.

In FIG. 8, the fastener 12 has an external diameter which corresponds to an external diameter of the sleeve 9. The sleeve 9 penetrates through the metal element 3 into the fastener 12 so that the fastener 12, i.e. its head region 16, but also the metal element 3, are plasticized in the relevant region. The welding joining plane of the fastener 12 and the metal element 3 is therefore arranged within the sandwich element 2 and not within the metal element 3. A hybrid connection is nevertheless also present in this example as shown in FIG. 8.

In FIG. 9, the fastener 12 is wider than the sleeve 9. As also shown in FIG. 8, the sleeve 9 plunges into the fastener 12, i.e. into its head region 16, although unplasticized webs 26 of the head region 16 remain on both sides of the effective region of the sleeve 9. The welding joining plane of the fastener 12 and the metal element 3 is arranged within the sandwich element 2 and the remaining webs 26.

Figure 10:
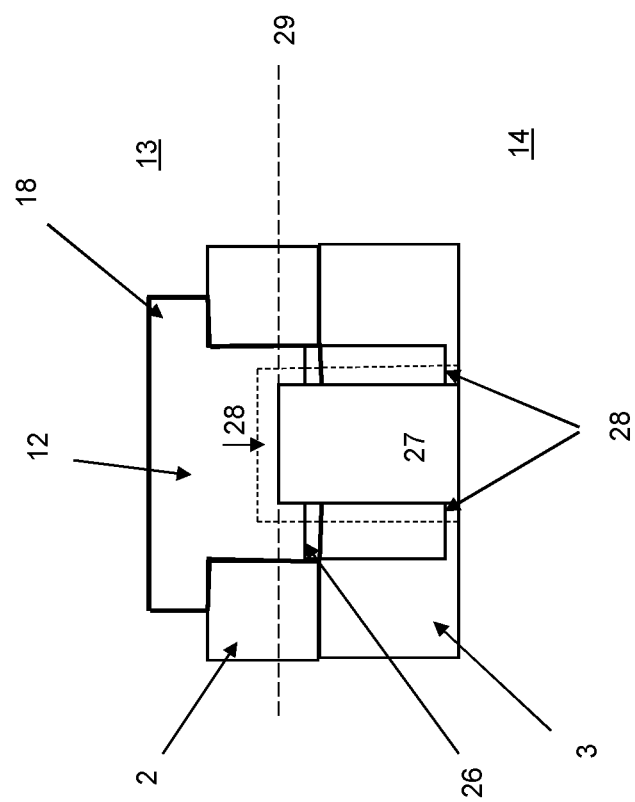
FIG. 10 shows a cross-section through two connected elements as a detail of the embodiment of FIG. 9.

FIG. 10 shows a cross-section through the two mutually connected elements 2 and 3 and through the fastener 12. The metal element 3 is arranged below the plane 29 of the drawing. The sandwich element 2 is arranged to partially extend above the plane 29. On its sandwich side, i.e. opposite the head region 16, the fastener 12 has an abutment flange 18 which abuts against the sandwich element 2.

The sleeve 9 is plunged into the metal element 2 until it reaches into the fastener 12, i.e. into the head region 16, as illustrated by a stir zone 27. The webs 26 are to the left and right of the stir zone 27.

The stir zone 27 is surrounded by a heat influence zone 28 as a result of a frictional heat produced. As can be seen in FIG. 10, the heat influence zone 28 is spaced from the sandwich element 2 so that thermal influence on the sandwich element 2 is minimized or eliminated. In this respect, the properties of the sandwich element 2 are not impaired by the frictional heat which plasticizes the metal element 3, but also the fastener 12. The welding joining plane is indicated by the reference sign 29 in FIG. 10. This joining plane 29 is located within the sandwich element 2.

While example embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for producing a connection between a sandwich element and a metal element, wherein the sandwich element has an interlayer arranged between two cover elements, comprising at least the steps:
   providing the sandwich element and the metal element;
   placing the sandwich element and the metal element in face-to-face contact at least partially overlapping;
   securing a fastener from a first sandwich-element side, wherein an abutment of the fastener abuts the sandwich element and a base of the fastener extends within the sandwich element; and
   friction welding, from a second opposing metal-element side, to form a hybrid connection having a mechanical connection between the fastener and the sandwich element on the first sandwich-element side via the abutment and a welding connection between a head region of the fastener opposite the abutment and the metal element.

2. The method as claimed in claim 1, wherein the friction welding is a friction stir weld process.

3. The method as claimed in claim 2, wherein only a portion of the metal element and the head region of the fastener are plasticized during the friction stir welding.

4. The method of claim 1, wherein the fastener is a rivet driven into the sandwich element such that a head of the rivet reaches the metal element.

5. The method of claim 1 further comprising pre-punching a hole into the sandwich element to receive the fastener.

6. The method of claim 1, wherein the fastener is of a similar material to a material of the metal element.

7. The method of claim 1, wherein a welding joining plane of the fastener and the metal element is arranged within the metal element.

8. The method of claim 1, wherein a welding joining plane of the fastener and the metal element is arranged within the sandwich element.

9. A connection assembly comprising:
   a sandwich element having an interlayer between two cover layers;
   a metal element;
   a supporting arm having first and second ends;
   a supply and holding device mounted to the first end to drive a fastener into the interlayer to generate a mechanical connection to the sandwich element via an abutment at a first fastener end; and
   a friction welding device mounted to the second end to weld the metal element to the fastener to form a hybrid connection between the sandwich element and the metal element having the mechanical connection between the fastener and the sandwich element and a welding connection between a head region of the fastener and the metal element at a second fastener end.

10. A method for connecting a sandwich element and a metal element comprising:
    driving a fastener into the sandwich element placed upon the metal element from a first sandwich-element side to generate a mechanical connection to the metal element such that an abutment of the fastener abuts the sandwich element and a base of the fastener is disposed within the sandwich element; and
    friction welding the metal element to the fastener from a second opposing metal-element side to form a hybrid connection including the mechanical connection between the fastener and the sandwich element on the first sandwich-element side via the abutment and a welding connection between a head region of the fastener opposite the abutment and the metal element.

* * * * *